United States Patent [19]

Kosugi et al.

[11] Patent Number: 4,740,959
[45] Date of Patent: Apr. 26, 1988

[54] SYSTEM FOR CONTROLLING A CHANGE OF SEQUENCE ORDER OF CHANNEL DATA

[75] Inventors: Toru Kosugi, Tochigi; Katsutoshi Miyaji, Utsunomiya; Kouichi Sugama, Tochigi; Tamio Oonuma, Oyama; Minoru Ishikawa, Tochigi, all of Japan

[73] Assignee: Fujitsu Limited, Kawasaki, Japan

[21] Appl. No.: 813,851

[22] Filed: Dec. 27, 1985

[30] Foreign Application Priority Data

Dec. 27, 1984 [JP]  Japan ............................ 59-278290
Dec. 28, 1984 [JP]  Japan ............................ 59-275381

[51] Int. Cl.$^4$ ........................ H04J 3/16; H04Q 11/04
[52] U.S. Cl. .................................. 370/95; 370/68; 340/825.03
[58] Field of Search ............. 370/95, 89, 79, 81, 370/90, 68; 340/825.03, 825.04

[56]  References Cited

U.S. PATENT DOCUMENTS

| 4,204,093 | 5/1980 | Yeh ............................... 370/95 |
| 4,298,977 | 11/1981 | Abbott et al. ................ 370/68 |
| 4,467,471 | 8/1984 | Troost .......................... 370/68 |
| 4,475,188 | 10/1984 | Wilson et al. ............ 340/825.04 |
| 4,545,053 | 10/1985 | Raamot ........................ 370/68 |

FOREIGN PATENT DOCUMENTS 0661831  5/1979  U.S.S.R. ........................... 370/95

Primary Examiner—Douglas W. Olms
Assistant Examiner—Curtis Kuntz
Attorney, Agent, or Firm—Staas & Halsey

[57]  ABSTRACT

A system for controlling a change of sequence order of channel data for a telecommunication terminal device including: a plurality of channel boards provided to a terminal device and each having transmitting and receiving portions; a multiplexing portion for multiplexing data sent from the channel boards so as to generate transmission data; a demultiplexing portion for demultiplexing reception data so as to send it to the channel boards; and a sequence order address signal generator for generating a sequence order address signal to a memory. The system includes a memory for receiving the sequence order signal and capable of rewriting data for changing a sequence order of channel data; a memory wire control portion for controlling data write access for the memory; and a channel pulse conversion portion for receiving data read out from the memory and for generating a channel pulse corresponding to the data read out from the memory, in which a data communication sequence order between the channel boards and the multiplexing portion is determined by the channel pulse.

2 Claims, 11 Drawing Sheets

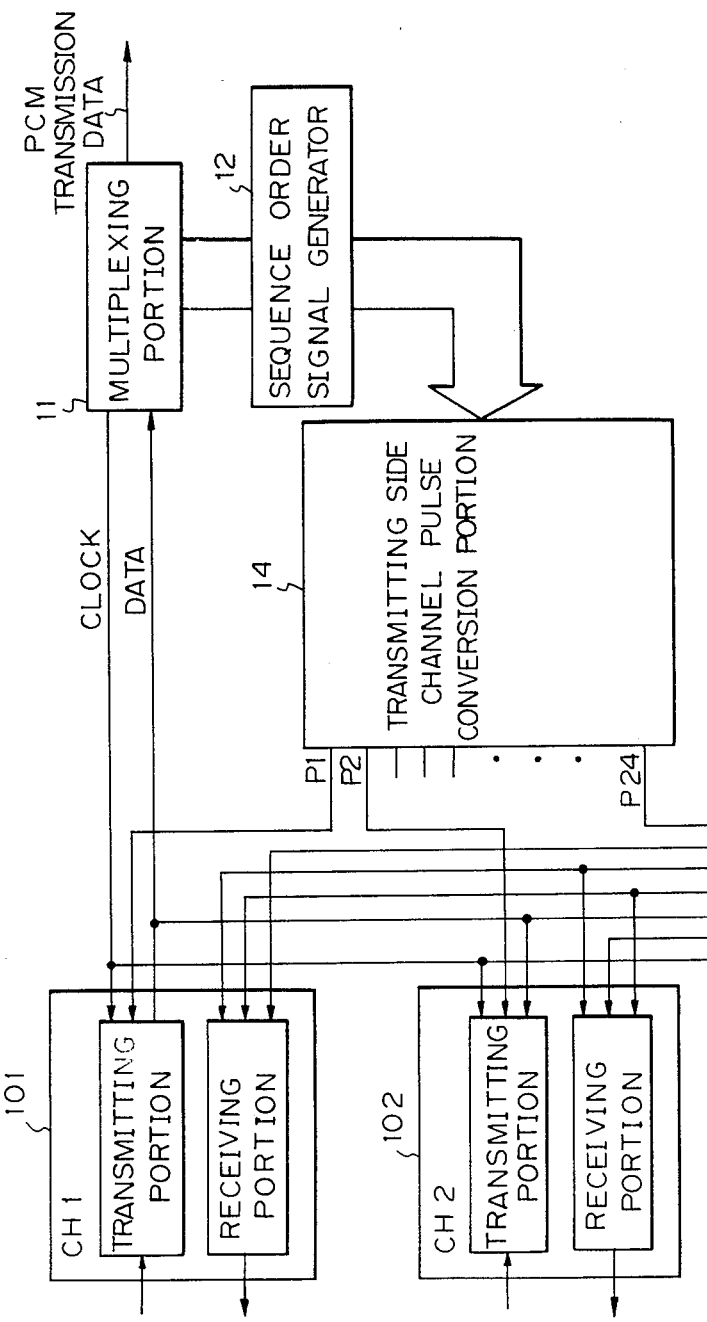

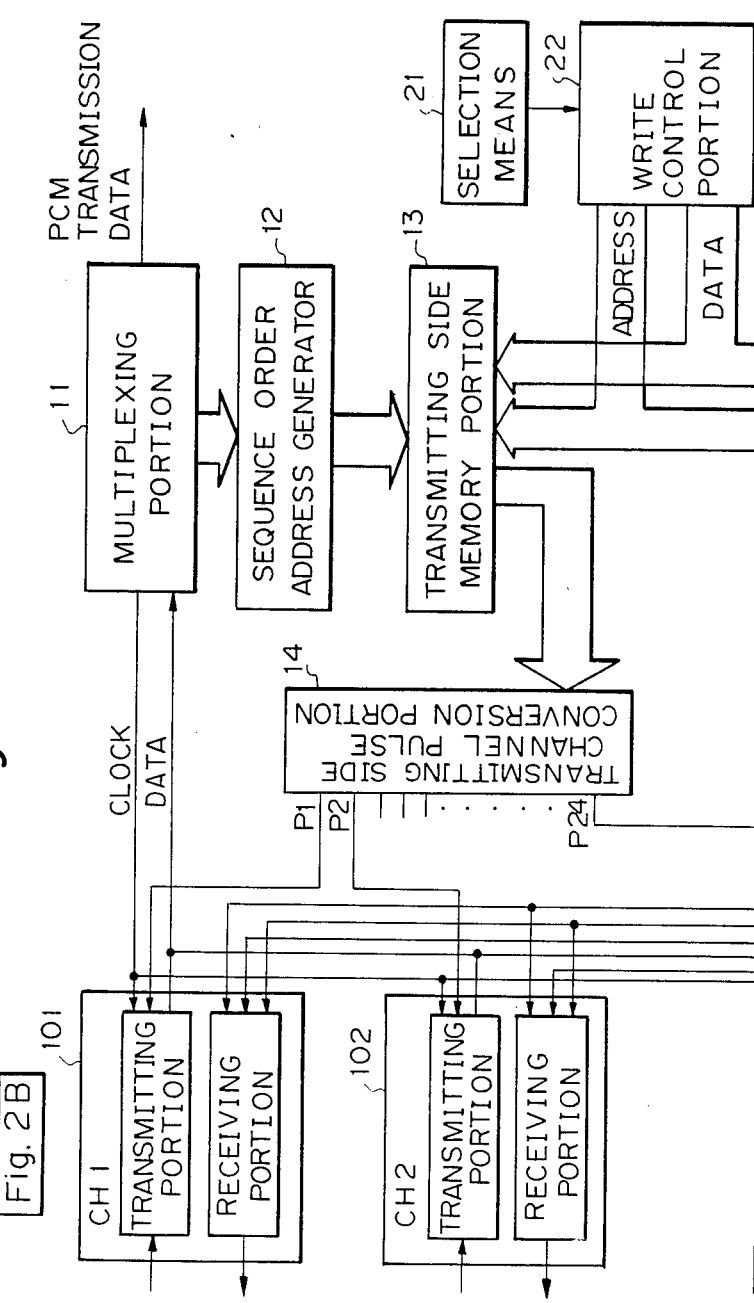

|  | TIME SLOT 1 | TIME SLOT 2 | TIME SLOT 3 |  | TIME SLOT 24 |
|---|---|---|---|---|---|
| CHANNEL 1 | 1 | 0 | 0 | ... | 0 |
| CHANNEL 2 | 0 | 1 | 0 |  | 0 |
| CHANNEL 3 | 0 | 0 | 1 |  | 0 |
| . | . | . | . | . | . |
| . | . | . | . | . | . |
| . | . | . | . | . | . |
| CHANNEL 24 | 0 | 0 | 0 |  | 1 |

| CHANNEL DATA 1 | CHANNEL DATA 2 | CHANNEL DATA 3 | --- | CHANNEL DATA 24 |
|---|---|---|---|---|
| TIME SLOT 1 | TIME SLOT 2 | TIME SLOT 3 |  | TIME SLOT 24 |

ONE FRAME

|  | TIME SLOT 1 | TIME SLOT 2 | TIME SLOT 3 |  | TIME SLOT 24 |
|---|---|---|---|---|---|
| CHANNEL 1 | 0 | 1 | 0 | · · · | 0 |
| CHANNEL 2 | 1 | 0 | 0 |  | 0 |
| CHANNEL 3 | 0 | 0 | 1 |  | 0 |
| · | · | · | · |  | · |
| · | · | · | · |  | · |
| · | · | · | · |  | · |
| CHANNEL 24 | 0 | 0 | 0 |  | 1 |

Fig. 9

| OPERATION OF SELECTOR | CONTROL DATA 1 | CONTROL DATA 2 | CONTROL DATA 3 | ... | CONTROL DATA 15 |
|---|---|---|---|---|---|
| | $L_1 \rightarrow l_1$ | $L_1 \rightarrow l_1$ | $L_1 \rightarrow l_1$ | | $L_1 \rightarrow l_3$ |
| | $L_2 \rightarrow l_2$ | $L_2 \rightarrow l_3$ | $L_2 \rightarrow l_2$ | | $L_2 \rightarrow l_1$ |
| | $L_3 \rightarrow l_3$ | $L_3 \rightarrow l_2$ | $L_3 \rightarrow l_4$ | | $L_3 \rightarrow l_4$ |
| | $L_4 \rightarrow l_4$ | $L_4 \rightarrow l_4$ | $L_4 \rightarrow l_3$ | | $L_4 \rightarrow l_2$ |

4,740,959

SYSTEM FOR CONTROLLING A CHANGE OF SEQUENCE ORDER OF CHANNEL DATA

BACKGROUND OF THE INVENTION

1. Field of the Invention

The present invention relates to a system for controlling a change of channel data sequence order for a PCM terminal device and, more particularly, to a sequence order control system which allows easy discrimination of channel data in a PCM terminal device having a number of channels.

2. Description of the Related Art

A conventional PCM terminal device comprises a plurality of channel boards each having transmitting and receiving portions, a multiplexing portion, a demultiplexing portion, a sequence order signal generator, a transmitting side channel pulse conversion portion, and a receiving side channel pulse conversion portion. The multiplexing portion transmits as PCM transmission data a frame constituted of 8-bit time slots TS1, TS2, . . . , TS24 following 1-bit frame identification data. The time slots TS1, TS2, . . . , TS24 of this data format correspond to transmission data sequentially transmitted from a transmitting portion in each channel board. In the conventional PCM primary group terminal device, each channel board is connected to a subscriber's telephone, exchange, and other devices.

When the transmitting portion of each channel board receives a transmission pulse from the transmitting side channel pulse conversion portion, it transmits transmission data corresponding to one time slot (8 bits). In this case, the time slots storing channel data of the respective channel boards have a predetermined fixed order, and data is transmitted from the multiplexing portion in this order.

In PCM reception data, the position of each time slot for each channel in the frame is fixed. Therefore, the demultiplexing portion transmits the time slot following the 1-bit identification data in the predetermined order of the channel boards.

The multiplexing portion multiplexes data transmitted from the channel boards as PCM transmission data in the predetermined order. Thus, the transmitting side channel pulse converter transmits the channel pulse P1 to the corresponding channel board transmitting portion to cause it to generate 8-bit transmission data, and then transmits the channel pulse P2 to the corresponding transmitting portion to cause it to generate 8-bit transmission data. In this way, when channel pulses P1, P2, . . . , P24 are sequentially transmitted to the transmitting portions of the channel boards, 8-bit transmission data is sequentially supplied to the multiplexing portion. Thus, the multiplexing portion generates the frame consisting of the time slots following the 1-bit identification bit. This control is repeated, and PCM transmission data is transmitted.

The demultiplexing portion processes PCM reception data in a manner opposite to that of the PCM transmission data. Since the order of time slots including the channel data in the frame is fixed, the channel pulses P1, P2, . . . are transmitted to the channel boards corresponding to the above order, and each time slot can be distributed to the receiving portion of the corresponding channel board.

The sequence order signal generator generates an order signal for generating the pulses P1, P2, . . . at predetermined time intervals in response to instructions from the multiplexing and demultiplexing portions. Upon reception of the order signal, the transmitting and receiving side channel pulse conversion portions sequentially transmit the channel pulses.

There is a strong demand for modifying the PCM terminal device by software without modifying the hardware when an office is moved. However, in the conventional PCM terminal device, since the order of channel data and time slots in the frame is predetermined, it is difficult to respond to this demand.

Furthermore, there is a demand for monitoring the operating state of each channel board by checking a specific time slot. However, only an output signal of a specific channel is present in the specific time slot. For example, when time slots are used for monitoring the operating state, since each time slot includes only the output from a certain channel board, the output state of other channel boards cannot be checked. Hence, when monitoring operation is performed using a specific time slot, the outputs of other channel boards must be allocated in the time slot. When this time slot is at a first position, an output of a channel board is inserted therein, and when at a second position, an output of another channel board is to be inserted. In this way, data of the channel boards must be exchanged. However, such an operation is complex, resulting in inconvenience.

Therefore, the present invention intends to solve the above drawbacks with a simple method.

SUMMARY OF THE INVENTION

It is an object of the present invention to provide a system for controlling a change of channel data sequence order for a PCM terminal device which can easily discriminate channel data sequence order by changing data written in a memory without modifying the hardware.

It is another object of the present invention to provide a channel data sequence order control system which can replace data between different DI groups by changing data written in a memory without modifying the hardware.

According to a basic aspect of the present invention, there is provided a system for controlling a change of channel data sequence order for a telecommunication terminal device including: a plurality of channel boards provided to a terminal device and each having transmitting and receiving portions; a multiplexing portion for multiplexing data sent from the channel boards so as to generate transmission data; a demultiplexing portion for demultiplexing reception data so as to send it to the channel boards; and a sequence order address signal generator for generating a sequence order address signal to a memory. The system includes a memory for receiving the sequence order address signal and capable of rewriting data for changing a sequence order of channel data; a memory write control portion for controlling data write access for the memory; and a channel pulse conversion portion for receiving data read out from the memory and for generating a channel pulse corresponding to the data read out from the memory, wherein a data communication sequence order between the channel boards and the multiplexing portion is determined by the channel pulse.

According to another aspect of the present invention, there is provided a system for controlling a change of sequence order of channel data for a telecommunication terminal device including: a plurality of groups of channel boards, each of said groups consisting of a plurality of channel boards, each of said channel boards having a transmitting portion and a receiving portion; a first channel data sequence order selector portion for receiving data sent from the channel board group; a second channel data sequence order selector portion for demultiplexing reception data so as to supply it to the channel board group; and a sequence order address signal generator for generating a sequence order address signal to a memory. The system includes a memory for receiving the sequence order address signal and capable of rewriting data for changing a sequence order of channel data; a memory write control portion for controlling data write access for the memory; and a channel data sequence order selector control portion for receiving data read out from the memory and for supplying a control signal to the channel data sequence order selector portion, wherein a data communication sequence order between the channel board groups and the first and second channel data sequence order selector portions is determined based on the data read out from the memory.

BRIEF DESCRIPTION OF THE DRAWINGS

FIGS. 1, 1A and 1B are block diagrams explaining a conventional device;

FIGS. 2, 2A and 2B are block diagrams showing a channel data sequence or control system according to an embodiment of the present invention;

FIGS. 8, 8A and 8B are block diagrams showing a DI group shown in FIG. 2 in more detail; and FIG. 9 is a table explaining the relationship between control data and a selector operating state.

DESCRIPTION OF THE PREFERRED EMBODIMENTS

Prior to a description of an embodiment of the present invention, a conventional PCM terminal device will be described with reference to FIG. 1.

Figure 1B:
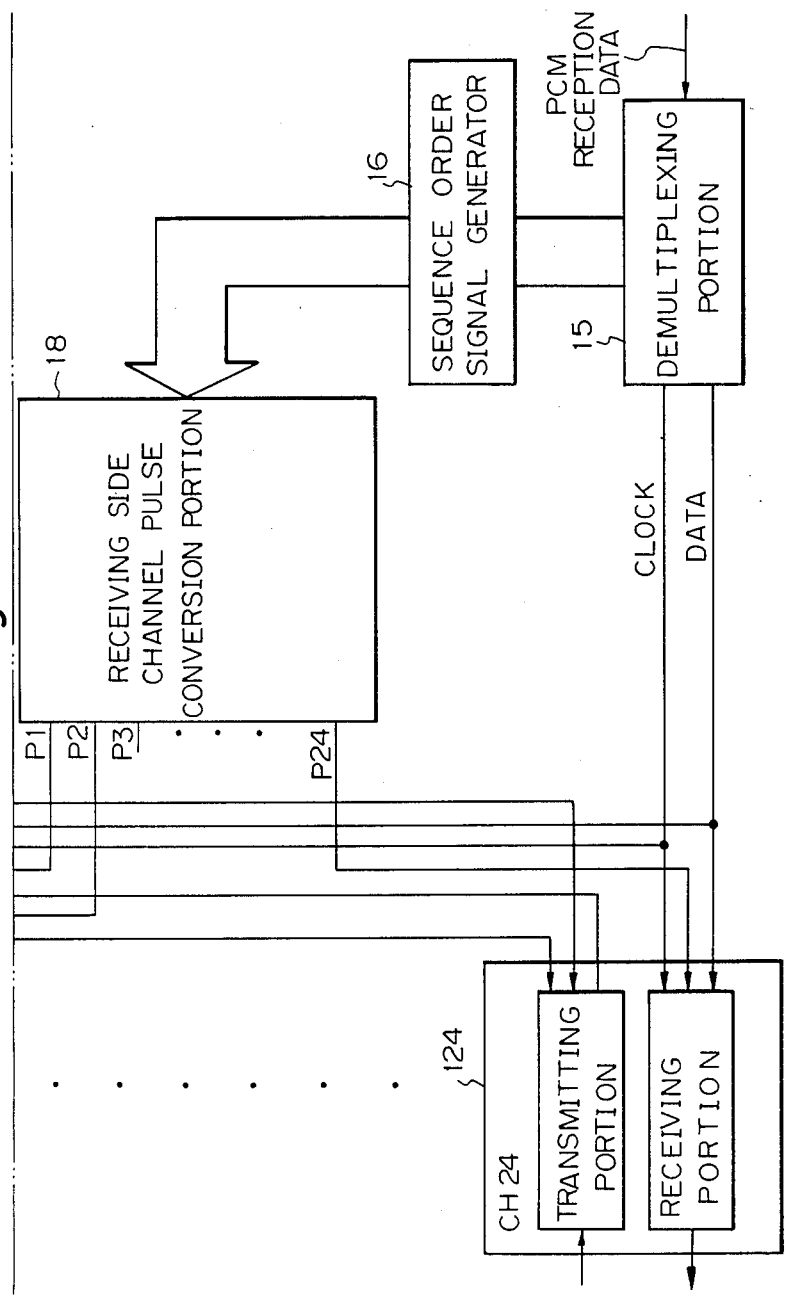

A conventional PCM terminal device shown in FIG. 1 comprises channel boards 101, 102, ..., 124 each having transmitting and receiving portions, a multiplexing portion 11, a demultiplexing portion 15, sequence order signal generators 12 and 16, a transmitting side channel pulse conversion portion 14, a receiving side channel pulse conversion portion 18, and the like. The multiplexing portion 11 transmits a frame consisting of 8-bit time slots TS1, TS2, ..., TS24 following 1-bit frame identification data. The time slots TS1, TS2, ..., TS24 of a data format correspond to transmission data sequentially transmitted from the transmitting portions of the channel boards 101, 102, ..., 124. The channel boards 101, 102, ..., 124 are connected to a subscriber's telephone, an exchange, and other devices.

When the transmitting portions of the channel boards 101, 102, ..., 124 receive transmission pulses P1, P2, ..., P24 from the transmitting side channel pulse conversion portion 14, they transmit transmission data corresponding to one time slot (8 bits). The time slots TS1, TS2, ..., TS24 storing the channel data of the channel boards 101, 102, ..., 124 have a predetermined order, and the multiplexing portion 11 transmits data in this order.

PCM reception data also has predetermined time slot positions in the frame. Hence, the demultiplexing portion 15 transmits the time slots following the 1-bit identification data to the corresponding receiving portions in the order of the channel boards 101, 102, ..., 124.

In order to multiplex data sent from the channel boards 101, 102, ..., 124 as PCM transmission data in the predetermined order, the portion 14 transmits the channel pulse P1 to the channel board 101 to cause it to generate 8-bit transmission data, and then transmits the channel pulse P2 to the channel board 102 to cause it to generate another 8-bit transmission data. In this way, when the channel pulses P1, P2, ..., P24 are sequentially transmitted to the corresponding transmitting portions of the channel boards 101, 102, ..., 124, the 8-bit transmission data can be sequentially transmitted to the multiplexing portion 11. Thus, the portion 11 can generate the frame consisting of the time slots TS1, TS2, ..., TS24 following the 1-bit identification data. This control is repeated, and the PCM transmission data is transmitted.

The demultiplexing portion 15 processes PCM reception data in a manner opposite to that of the PCM transmission data. Since the order of time slots including the channel data in the frame is fixed, the channel pulses P1, P2, ... are transmitted to the channel boards corresponding to the above order, and each time slot can be distributed to the receiving portion of the corresponding channel board.

The sequence order signal generators 12 and 16 generate an order signal for generating the pulses P1, P2, ... at predetermined time intervals in response to instructions from the multiplexing and demultiplexing portions. Upon reception of the order signal, the transmitting and receiving side channel pulse conversion portions sequentially transmit the channel pulses.

A channel data sequence order control system according to an embodiment of the present invention will be described with reference to FIG. 2.

Figure 2B:
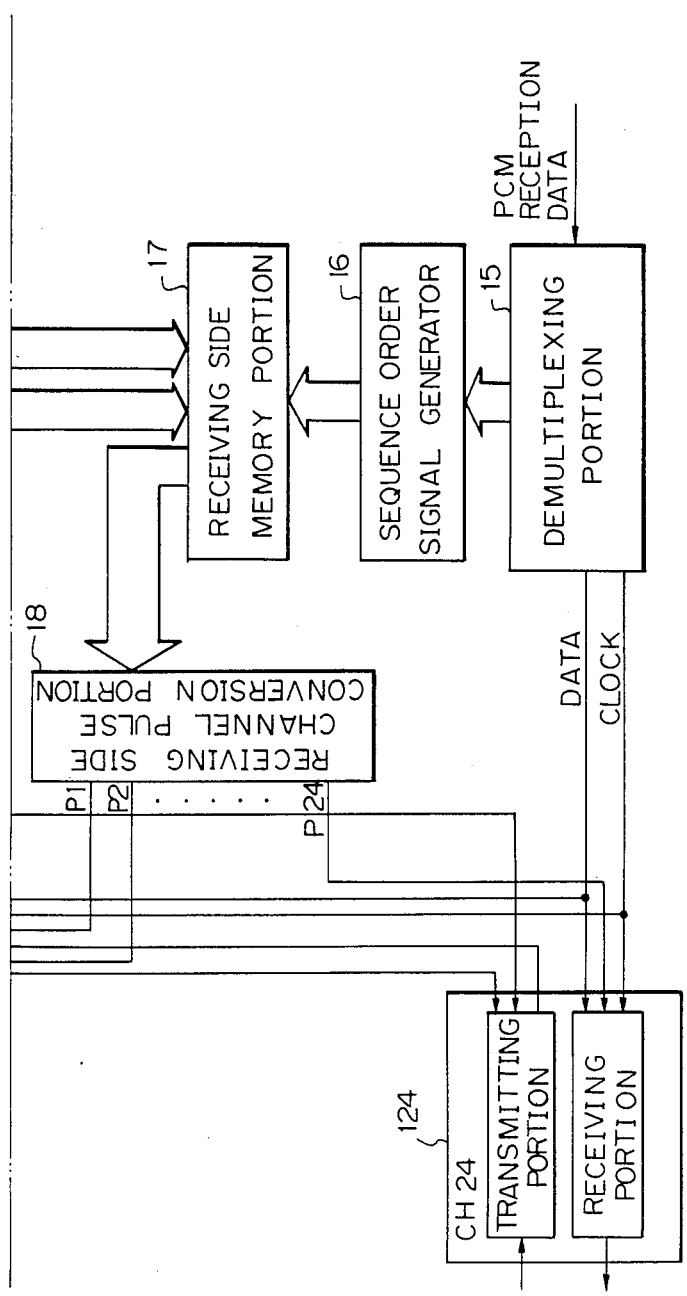

Referring to FIG. 2, reference numeral 11 denotes a multiplexing portion; 12, a sequence order address generator; 13, a transmitting side memory portion; 14, a transmitting side channel pulse conversion portion; 15, a demultiplexing portion; 16, a sequence order signal generator; 17, a receiving side memory portion; 18, a receiving side channel pulse conversion portion; 19, a write control portion; and 101 to 124, channel boards each having transmitting and receiving portions.

The multiplexing portion 11 multiplexes data transmitted from the channel boards (CH1 to CH24) 101, 102, ..., 124 as PCM transmission data.

Figure 5:
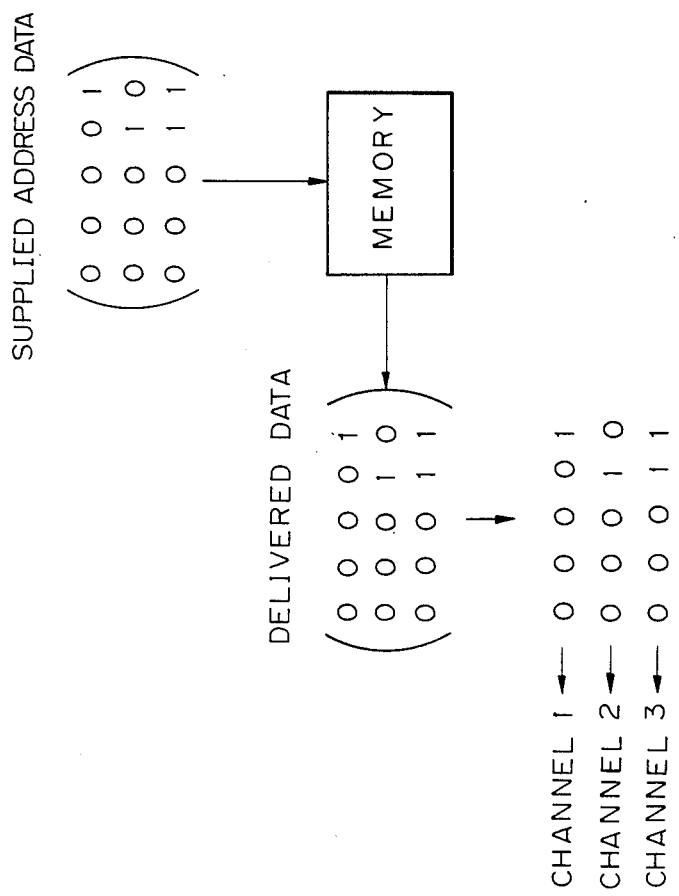
FIG. 5 is a diagram explaining a method for deriving 5-bit address data from a memory.

The sequence order address generator 12 sequentially generates addresses (e.g., 5-bit address data, as shown in FIG. 5) for accessing the memory portion 13 in accordance with the time slots. Therefore, the generator 12 generates addresses "00001", "00010", "00011", ....

The memory portion 13 stores channel pulse generation data which indicates to which channel boards (CH1 to CH24) 101, 102, ..., 124 the channel pulse is to be selectively generated. For example, the portion 13 comprises rewritable memories, e.g., a PROM, an E$^2$-ROM, a RAM, and the like. The output data from the portion 13 has a 5-bit configuration. For example, when the address data sequentially changes "1", "2", "3", ...

in the decimal notation as shown in FIG. 5, data "1", "2", "3", ... in the decimal notation is generated in response.

The transmitting side channel pulse conversion portion 14 generates channel pulses for instructing supply of transmission data to the channel boards (CH1 to CH24) 101, 102, ..., 124 in response to the channel pulse generation data sent from the memory portion 13. For example, when data "1" in the decimal notation is supplied, the portion 14 transmits the channel pulse P1 only to the channel board (CH1) 101. Upon reception of data "2" in the decimal notation, the portion 14 transmits the channel pulse P2 only to the channel board (CH2) 102. Therefore, when the channel pulse generation data "1", "2", "3", ... in the decimal notation is generated from the memory portion 13, the portion 14 sequentially generates the channel pulses P1, P2, P3, ... in response.

When the demultiplexing portion 15 receives the multiplexed PCM signal, it operates to accurately control the distribution of the time slots to the corresponding channel boards.

The sequence order address generator 16 sequentially generates address data for accessing the memory portion 17 in accordance with the time slots, and is operated in the same manner as the generator 12.

The memory portion 17 stores channel pulse generation data which indicates to which channel boards (CH1 to CH24) 101, 102, ..., 124 the channel pulse is to be selectively supplied. The portion 17 has the same arrangement as that of portion 13.

The receiving side channel pulse conversion portion 18 selectively generates the channel pulses for instructing reception of data to the channel boards (CH1 to CH24) 101, 102, ..., 124 in accordance with the channel pulse generation data from the memory portion 17, and is operated in the same manner as the portion 14.

The write control portion 19 performs various control operations for writing data in the memory portion 13 or 17, and can change the channel pulse generation data generated from the memory portion 13 with respect to an identical address.

The operation of the system shown in FIG. 2 will be described.

Figure 3:
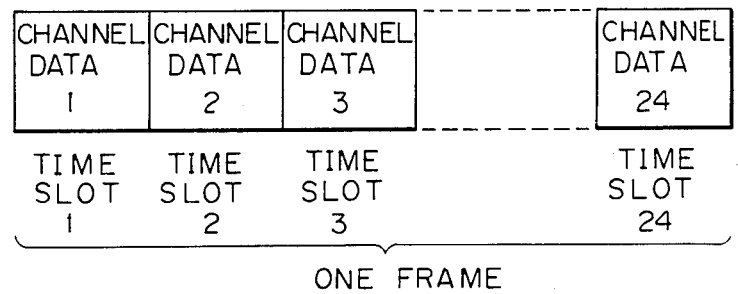
FIGS. 3 and 4 are diagrams explaining the relationship between time slots and channel data.
Figure 6:
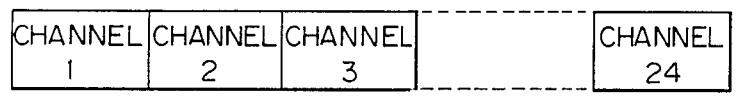
FIG. 6 is a diagram explaining original data stored at corresponding addresses of a memory.

The operation in a normal state will first be described. The write control portion 22 writes the channel pulse generation data in the memory portion 13 so that decimal data "1", "2", "3", ..., "24" is generated in correspondence with address data 1, 2, 3, ..., 24, as shown in FIG. 6. The address data 1, 2, ... is then sequentially generated by the generator 12. Thus, the channel pulse generation data is sequentially supplied to the conversion portion 14. In response to this, the portion 14 first supplies the channel pulse P1 to the transmitting portion of the channel board (CH1) 101, and then supplies the channel pulse P2 to the transmitting portion of the channel board (CH2) 102. In this manner, based on the channel pulse generation data "1", "2", ..., the channel pulses P1, P2, ... are sequentially transmitted to the channel boards (CH1, CH2, ...) 101, 102, ..., 124. (See FIG. 3) Upon reception of the pulses, the transmitting portions of the channel boards (CH1, CH2, ...) 101, 102, ..., 124 individually supply 8-bit data to the multiplexing portion 11, which multiplexes the reception data. Thus, as shown in FIG. 6, the frame in which the data from the channel boards (CH1, CH2, ...) 101, 102, ..., 124 is distributed to the time slots TS1, TS2, ... is formed, and is generated as the PCM transmission data.

Unless the write control portion 19 changes the storage data of the memory portion 13, the frame data having this data distribution order is transmitted. In this case, since the receiving side can identify the distribution order of the frame data, the same data as that in the memory portion 13 is stored in the memory portion 17. Therefore, when the address data 1, 2, ..., is generated from the sequence order address generator 16, the channel pulse generation data "1", "2", ... is generated from the memory portion 17. Upon reception of the data "1", "2", ..., the conversion portion 18 sequentially transmits the channel pulses P1, P2, ... to the receiving portions of the channel boards (CH1, CH2, ...) 101, 102, ..., 124. In this way, the data in the corresponding time slots TS1, TS2, ... is received by the predetermined channel boards (CH1, CH2, ...) 101, 102, ..., 124.

The operation for changing the channel data sequence order will now be described.

Figure 7:
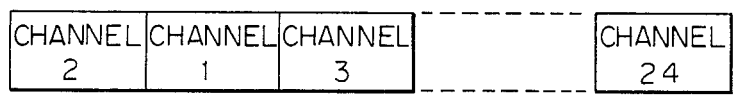
FIG. 7 is a diagram explaining a case when a channel 1 is replaced with a channel 2.

A case will be described wherein the output from the channel board (CH1) is arranged in the time slot TS2, and the output from the channel board (CH2) is arranged in the time slot TS1. The write control portion 19 writes data in the memory portion 13. In this case, the data at the address 1 is stored at the address 2. (see FIG. 7) When the address data normally 1, 2, ..., 24 is generated from the generator 12, the channel pulses P1, P2, ... are transmitted from the conversion portion 14 to the channel boards (CH1, CH2, ...) 101, 102, ..., 124.

Figure 4:
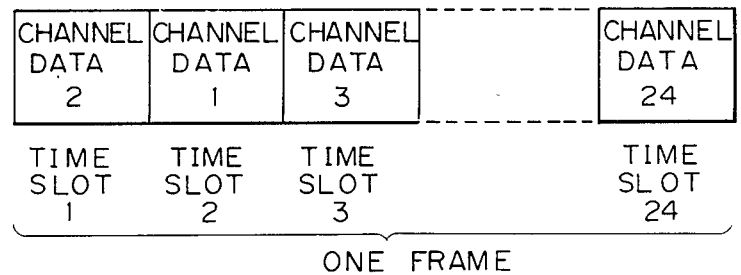

However, since decimal data "1" is written at the address 2, the channel pulse is transmitted to the channel board (CH1) 101. Hence, the multiplexing portion 11 generates first frame data in which data generated from the channel board (CH1) 101 is stored in the time slot TS2. (see FIG. 4)

At the receiving side, the write control portion 19 controls the memory portion 17 so as to distribute the reception data to the predetermined channel boards in the same manner as the memory portion 13. Thus, data received in other channel boards can be sequentially distributed to a specific channel board at the reception side.

As described above, the output from the channel board (CH1) can be arranged in the time slot TS2, and the output from the channel board (CH2) can be arranged in the time slot TS1. It should be noted that the above-mentioned address data and output data from the memory portions have a 5-bit configuration.

Figure 8A:
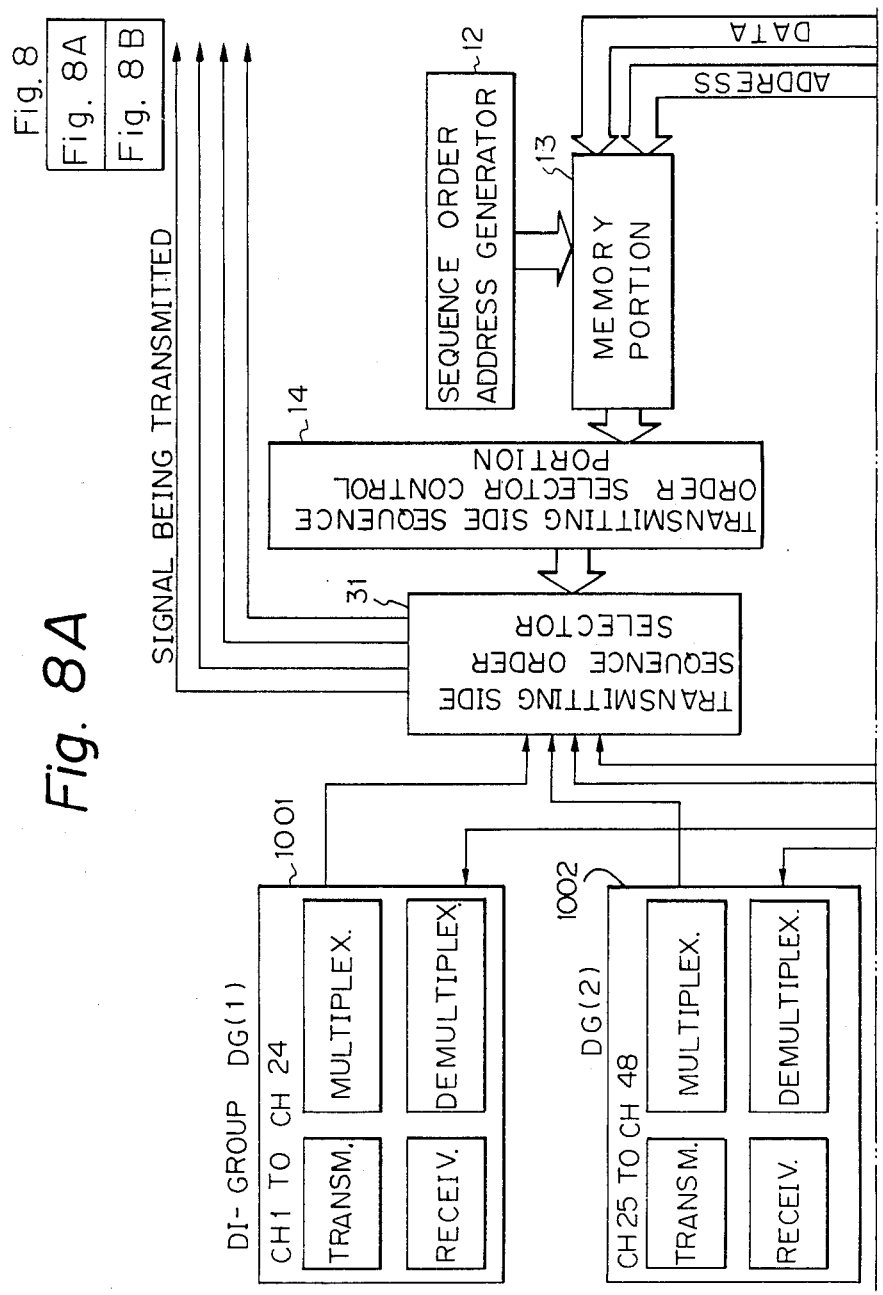
Figure 8B:
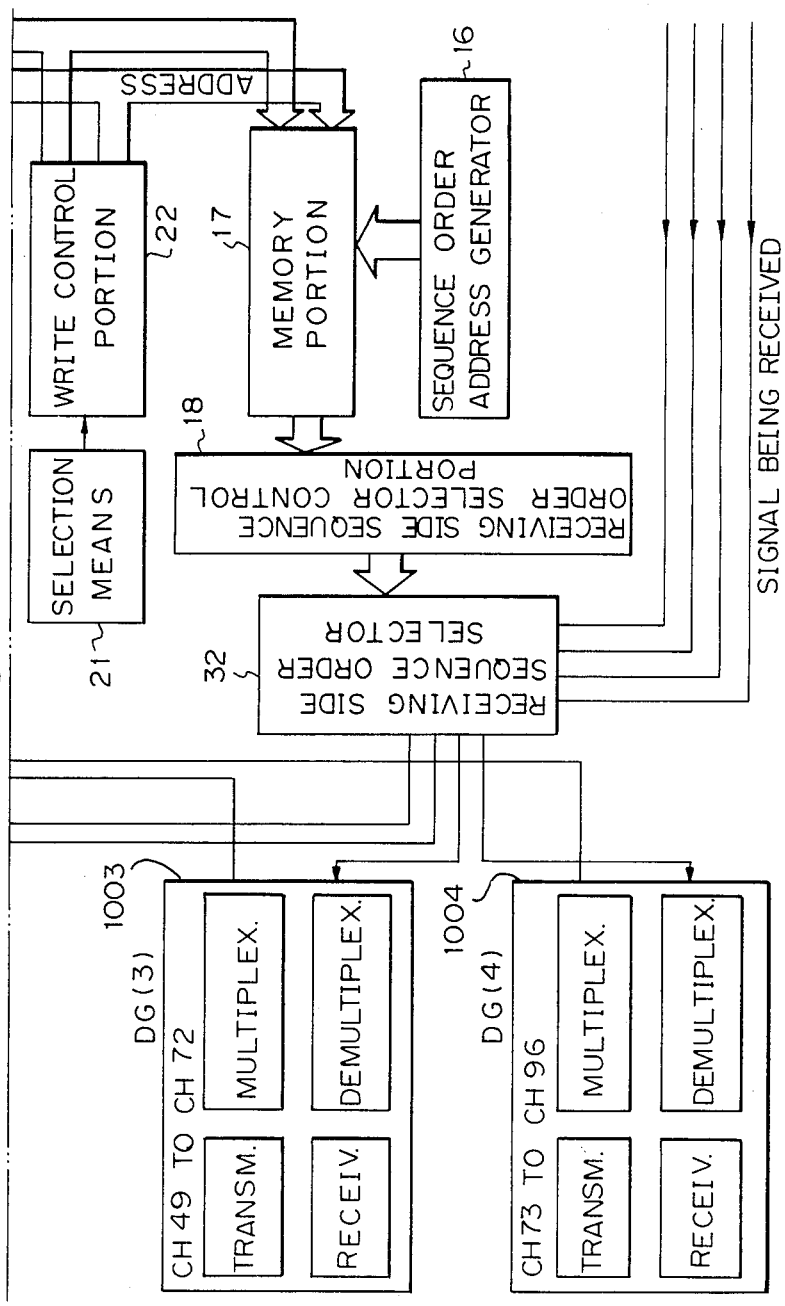

FIG. 8 shows a modified embodiment of the present invention that is applied to a PCM primary group terminal device.

Referring to FIG. 8, reference numeral 31 denotes a transmitting side sequence order selector, which performs sequence order control of data in identical time slots transmitted from DI groups (DG1 to DG4) 1001 to 1004 based on a control signal (to be described later); 14, a transmitting side sequence order selector control portion, which generates a control signal for controlling the selector 31 based on control data supplied from a memory portion 13; and 13, a memory portion storing control data for controlling the selector 31.

Reference numeral 12 denotes a sequence order address generator, which sequentially generates address data for accessing the memory portion 13; 11, a sync multiplexing portion for performing various control operations (e.g., for generating a reference signal for transmission timings of multiplexing); 32, a receiving side sequence order selector, which performs sequence order control of a reception signal with respect to any of the DI groups (DG1 to DG4) 1001 to 1004; 18, a receiving side sequence order selector control portion, which generates a control signal for controlling the selector 32 based on control data supplied from a memory portion 17; 16, a sequence order address generator, which sequentially generates address data for accessing the memory portion 17; 15, a sync demultiplexing portion for performing various control operations (e.g., for establishing frame synchronization by multiplexed data so as to generate a reference signal for a reception timing); and 22, a write control portion which performs various control operations for writing control data into the memory portion 13 or 17, and can change the control data generated at the identical address. In addition, reference numeral 21 denotes a data selector means.

The memory portion 13 will now be described. The memory portion 13 stores control data which is decoded by the control portion 14 and generates switching data for switching control of the selector 31. For example, as shown in FIG. 9, when the control data corresponds to decimal number "1", the control portion 14 generates switching data for connecting an input line L1 to an output line l1; L2 to l2; L3 to l3; and L4 to l4. On the other hand, when the control data corresponds to decimal number 2, the control portion 14 generates the switching data for connecting L1 to l1: L2 to l3; L3 to l2; and L4 to l4. That is, the lines L2 and L3 are swapped. When the control data corresponds to decimal number "3", the control portion 14 generates the switching data for connecting the line L1 to the line l1; L2 to l2; L3 to l4; and L4 to l3. That is, the lines L3 and L4 are replaced. When the control data corresponds to decimal number "15", the portion 14 generates the switching data for connecting the line L1 to the line l3; L2 to l1; L3 to l4; and L4 to l3. Since the memory portion 13 is accessed based on, e.g., 5-bit address data, it can store 32 control data. The selector operation based on the control data 4 to 14, 16, . . . (not shown in FIG. 9) can be freely set, and a further description thereof will be omitted. Therefore, predetermined sequence order control is achieved such that necessary data from the memory portion 13 is selectively written in the write control portion 22 in accordance with individual sequence order control conditions.

At the receiving side, the operation opposite to above can be performed. For example, when the control data from the memory portion 17 corresponds to decimal number "1", the control portion 18 generates the switching data for connecting an input line l1' of the selector 32 to an output line L1'; l2' to L2'; l3' to L3'; and l4' to L4'. When the control data corresponds to decimal number "2", the control portion 18 generates the switching data for connecting the line 1' to the Line L1'; l2' to L340 ; l3' to L2'; and l4' to L4'. When the control data corresponds to decimal number "3", the portion 18 generates the switching data for connecting the line l1' to the line L1'; l2' to L2'; l3' to L4'; and l4' to L3'. The sequence order to be changed differs in accordance with applications, and the control data corresponding to each application is selectively written under the control of the write control portion 22.

The operation of the system shown in FIG. 8 will be described.

The normal operation will now be described. In this case, data corresponding to decimal number "1" is prestored at all the addresses of the memory portion 13. Therefore, even if the generator 12 generates the address data "1", "2", . . . , "24", the control data "1" is read out from the memory portion 13. As a result the connection between lines L1 to l1, L2 to l2, L3 to l3, and L4 to l4 are maintained based on the switching data generated from the control portion 14. Thus, data which is not subjected to sequence order control among data strings from respective channels, i.e., a plurality of sets of synchronized serial data, are generated.

The operation for channel data sequence order control will be described. In this case, decimal data "1", "2", . . . , "15" are prestored at the addresses 1, 2, . . . , 24 of the memory portion 13, respectively. Therefore, when the generator 12 sequentially generates the address data "1", "2", . . . , "24", the control data "1", "2", . . . , "15" corresponding thereto is sequentially read out from the portion 13. When the control data "1" is supplied, connection between the lines L1 to l1, L2 to l2, L3 to l3, and L4 to l4 is performed. However, when the control data is "2", connection between lines L1 to l1, L2 to l3, L3 to l2, and L4 to l4 is performed, and a sequence order of 1-word data on the lines L2 and L3 is changed. When the control data is "15", connection between lines L1 to l3, L2 to l1, L3 to l4, and L4 to l2 is performed, and the sequence order of each channel data string is changed. This sequence order control state is an example. When the relationship between the control data and the switching data is determined in advance and the control data is written in the memory portion 13 under the control of the write control portion 22, the channel data sequence order control for each time slot or each frame can be performed desirably.

In the above embodiment, the data sequence order control among channel data strings has been described. A multiplexing order in the channel data string can be changed by modifying the DI groups. A generation order of the transmitting side channel pulses from a sequence order address generator is controlled by data written in a memory portion. However, when data corresponding to decimal number "2" is generated from the memory portion, if the transmitting side channel pulse conversion portion generates the channel pulses in the order of P1, P3, P2, P4, . . . , P24, transmission data can be multiplexed in the order of channel boards CH1, CH3, CH2, . . . , CH24. In this way, a plurality of channel pulse generation conditions between data from the memory portion and the transmitting side pulse conversion portion are determined in advance, and data is selectively written in the memory portion by the write control portion, thus changing the channel data order.

Therefore, when control circuits are respectively provided for the DI groups (DG 1 to DG4) 1001 to 1104, word positions not only among channel data strings but also in each channel data string can be controlled.

In the above descriptions, the DI groups comprise 24 channel boards, and the output data or address data from the memory portion has a 5-bit configuration. However, the present invention is not limited to those arrangements, and other bit numbers can be selected.

We claim:

1. A system for controlling a change of sequence order of channel data for a telecommunication terminal device, comprising:
   a plurality of channel boards provided to a terminal device and each having transmitting and receiving portions;

a multiplexing portion, connected to said channel boards, for multiplexing data sent from said channel boards so as to generate transmission data;

a demultiplexing portion, connected to said channel boards, for demultiplexing reception data so as to send it to said channel boards;

a first sequence order address signal generator, connected to said multiplexing portion, for generating a multiplex sequence order address signal;

a second sequence order address signal generator, connected to said demultiplexing portion, for generating a demultiplex sequence order address signal;

a transmitting memory, connected for said first sequence order address generator, for receiving the multiplex sequence order address signal and producing transmitting pulse sequence data, and capable of rewriting data for changing a multiplex sequence order of the channel data;

a receiving memory, connected to said second sequence order address generator, for receiving the demultiplex sequence order address signal and producing receiving pulse sequence data, and capable of rewriting data for changing a demultiplex order of the channel data;

a memory write control portion for controlling data write access for the transmitting and receiving memories;

a receiving channel pulse conversion portion, connected to said receiving memory and said channel boards, for receiving the receiving pulse sequence data from said receiving memory and for generating a receiving channel pulse, corresponding to the data read out from said receiving memory, activating one said channel boards; and a transmitting channel pulse conversion portion, connected to said transmitting memory and said channel boards, for receiving the transmitting pulse sequence data read out from said transmitting memory and generating a transmitting channel pulse, corresponding to the data read out from said transmitting memory, activating one of said channel boards, data communication sequence order between said channel boards and said multiplexing and demultiplexing portions being determined by the transmitting and receiving channel pulses.

2. A system for controlling a change of sequence order of channel data for a telecommunication terminal device, comprising:

a plurality of groups of channel boards, each of said channel boards having a transmitting portion and a receiving portion;

a first channel data sequence order selector portion, connected to said channel groups, for receiving data sent from said channel board group;

a second channel data sequence order selector portion, connected to said channel groups, for demultiplexing reception data so as to supply it to said channel board group;

a first sequence order address signal generator for generating a transmitting sequence order address signal;

a second sequence order address signal generator for generating a receiving sequence order address signals;

a transmitting memory, connected to said first sequence order address signal generator, for receiving the transmitting sequence order address signal and producing transmitting sequence order data, and being rewritten for changing a transmitting sequence order of channel data;

a receiving memory, conencted to said second sequence order address signal generator, for receiving the receiving sequence order address signal and producing receiving sequence order data, and being rewritten for changing a receiving signal order of channel data;

a memory write control portion for controlling data write access for said transmitting and receiving memories;

a transmitting channel data sequence order selector control portion, connected to said transmitting memory and said first channel data sequence order selector portion, for receiving the transmitting sequence order data read out from said memory and supplying a control signal to said first channel data sequence order selector portion activating one of said groups; and a receiving channel data sequence order selector control portion, connected to said receiving memory and said second channel data sequence order selector portion, for receiving receiving sequence order data read out from said memory and supplying a control signal to said second channel data sequence selector portion activating one of the groups, data communication sequence order between said channel board groups and said first and second channel data sequence order selector portions being determined based on the sequence order data read out from said memory.

* * * * *

UNITED STATES PATENT AND TRADEMARK OFFICE
CERTIFICATE OF CORRECTION

PATENT NO. : 4,740,959

DATED : April 26, 1988

INVENTOR(S) : Kosugi et al.

It is certified that error appears in the above-identified patent and that said Letters Patent is hereby corrected as shown below:

Column 3, line 26, delete "1,";

line 28, delete "2,";

line 29, delete "or";

line 39, delete "8";

line 58, "..." should be --...,--;

line 59, ", TS24" should be --TS24--.

Column 6, line 25, "data at" should be --data normally at--;

line 25, "2. (see" should be --2 (see--;

line 26, "7)" should be --7).--;

line 26, delete "normally";

line 36, "TS2. (see" should be --TS2 (see--;

line 36, "4)" should be --4).--.

UNITED STATES PATENT AND TRADEMARK OFFICE
CERTIFICATE OF CORRECTION

PATENT NO. : 4,740,959

DATED : April 26, 1988

INVENTOR(S) : Kosugi et al.

It is certified that error appears in the above-identified patent and that said Letters Patent is hereby corrected as shown below:

* Column 7, line 34, "replaced" should be --swapped--;

line 56, "L340;" should be --L3';--.

Column 10, line 23, "conencted" should be --connected--.

Signed and Sealed this

Eleventh Day of October, 1988

Attest:

DONALD J. QUIGG

*Attesting Officer*     Commissioner of Patents and Trademarks